US005520990A

United States Patent [19]

Rotermund

[11] Patent Number: 5,520,990

[45] Date of Patent: May 28, 1996

[54] SHIPPING LABEL

[75] Inventor: Ralph W. Rotermund, Madison, Conn.

[73] Assignee: Printing for Systems, Inc., Madison, Conn.

[21] Appl. No.: 258,622

[22] Filed: Jun. 10, 1994

[51] Int. Cl.[6] .......... B32B 3/00

[52] U.S. Cl. .......... 428/195; 428/42.1; 428/48; 428/174; 428/187; 428/537.5; 281/5; 283/81; 283/105

[58] Field of Search .......... 428/42, 43, 48, 428/220, 195, 187, 537.5, 174, 213; 281/2, 5, 81; 283/81, 105

[56] References Cited

U.S. PATENT DOCUMENTS

| | | | |
|---|---|---|---|
| 4,598,935 | 7/1986 | Stewart | 283/81 |
| 4,699,833 | 10/1987 | Instance | 428/42 |
| 4,744,161 | 5/1988 | Instance | 40/2 R |
| 4,850,613 | 7/1989 | Instance | 281/5 |
| 4,968,547 | 11/1990 | McCarthy | 428/42 |
| 5,209,698 | 5/1993 | Dolan | 462/17 |
| 5,299,979 | 4/1994 | Ballard | 462/18 |
| 5,348,780 | 9/1994 | Boggs et al. | 428/42 |
| 5,370,302 | 12/1994 | Dyer | 229/92.8 |
| 5,402,934 | 4/1995 | Sauerwine | 229/303 |

*Primary Examiner*—Patrick J. Ryan
*Assistant Examiner*—William A. Krynski
*Attorney, Agent, or Firm*—Kenyon & Kenyon

[57] ABSTRACT

A shipping label is provided for use by a first party to prepare a shipping container for delivery to a second party, and thereafter by the second party to return the shipping container to the first party. The shipping label includes a return label, the back surface of which is attachable to the shipping container. The address of the first party is printed on the front surface of the return label. The shipping label also includes an initial address label, the back surface of which is releasably secured to the front surface of the return label, thereby at least partially covering the return label. The address of the second party is imprinted on the front surface of the initial address label. The shipping label is affixed to the shipping container by the first party to facilitate delivery of the shipping container to the address of the second party indicated on the initial address label. The second party can, after receiving the shipping container, peel off the initial address label from the return label, thereby exposing the return label, which remains affixed to the shipping container to facilitate delivery of the shipping container to the first party.

19 Claims, 3 Drawing Sheets

SHIPPING LABEL

TECHNICAL FIELD OF THE INVENTION

The present invention relates to shipping labels that can be affixed to shipping cartons or containers to provide address and other information related to the shipment.

BACKGROUND OF THE INVENTION

A shipping label may be affixed to a shipping carton to provide information such as the recipient's name and address to facilitate delivery of the carton by the post office or a delivery service. Commercially available shipping labels are generally intended to be used only once for delivery of the carton from a sender to a recipient. If the recipient wishes to return the carton and its contents to the sender, he or she must take the additional steps of replacing the original label on the carton with a new label or otherwise marking the carton to indicate the new delivery address to prepare the carton for delivery. If the new address is somehow incorrectly or incompletely marked on the carton, the carton may become lost or its delivery may be delayed.

One object of the present invention is to provide a shipping label that can be used both by an original shipper to send a carton to a recipient and by the recipient to return the carton to the shipper wherein a pre-addressed label is provided on the carton for the return delivery to the shipper.

Another object of the invention is to provide a shipping label capable of receiving laser imaged bar codes or other optically scannable markings thereon to facilitate outgoing shipment tabulation and return shipment reconciliation.

Another object of the invention is to provide a label including an advisory postcard that may be detached from the label and sent separately to the original shipper to indicate a return of the shipment.

SUMMARY OF THE INVENTION

A shipping label in accordance with the present invention may be used by an original shipper to prepare a shipping container for delivery to an intended recipient, and thereafter by the recipient to return the shipping container to the original shipper, if necessary. The shipping label includes a return label, the back surface of which is attachable to the shipping container. The front surface of the return label is pre-addressed to indicate the address of the original shipper. The shipping label also includes an initial address label, the back surface of which is releasably secured to the front surface of the return label, thereby at least partially covering the return label. The address of the intended recipient is imprinted on the front surface of the initial address label.

In use, the shipping label is affixed to the shipping container by the original shipper to prepare the container for delivery to the address of the intended recipient, which has been printed on the initial address label. The recipient can, after receiving the shipping container, peel off the initial address label from the return label, thereby exposing the return label, which remains affixed to the shipping container to facilitate delivery of the shipping container back to the original shipper. Since the return label has been pre-addressed to the shipper, the recipient need not mark the container to indicate a new delivery address.

In accordance with another embodiment of the invention, the label may include a detachable advisory postcard that is pre-addressed to the original shipper. The recipient of the shipment can send the postcard to the shipper to indicate a returning shipment and to facilitate processing thereof.

The label and postcard may have bar codes or other optically scannable marks or symbols laser imaged thereon to facilitate outgoing shipment tabulation and return reconciliation by the shipper.

DETAILED DESCRIPTION

Figure 1:
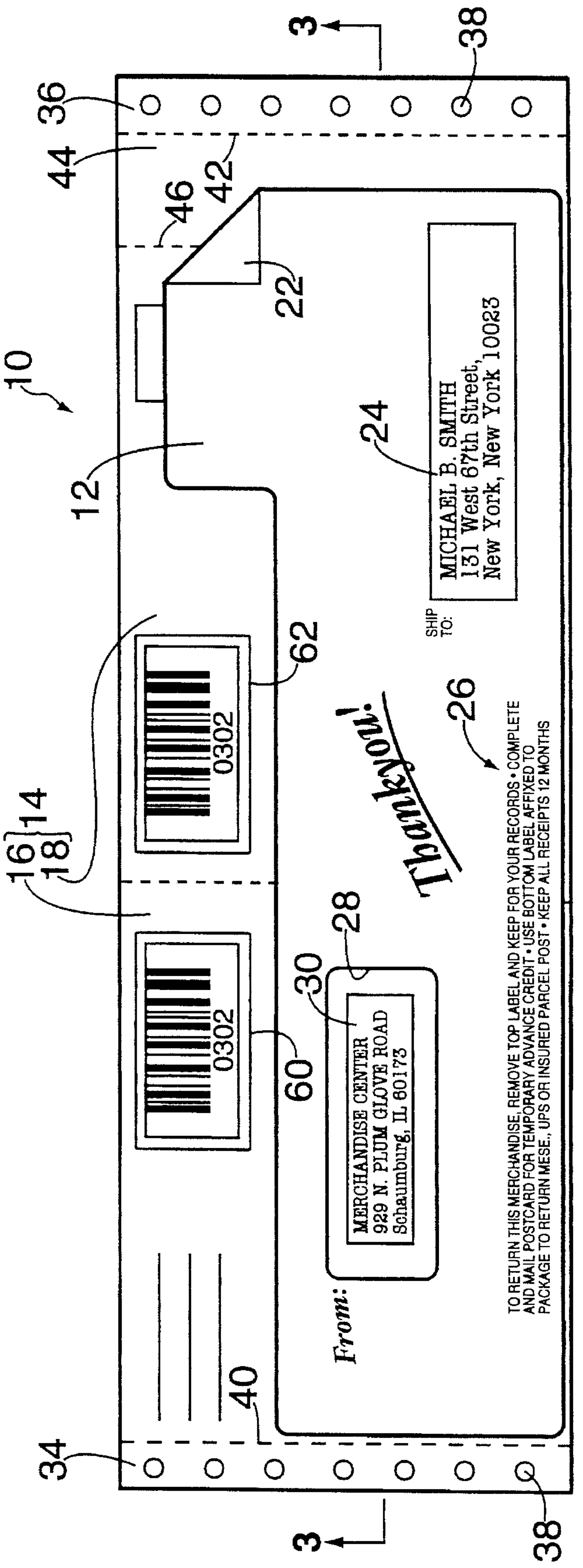
FIG. 1 is a top view of a shipping label in accordance with the invention.
Figure 3:
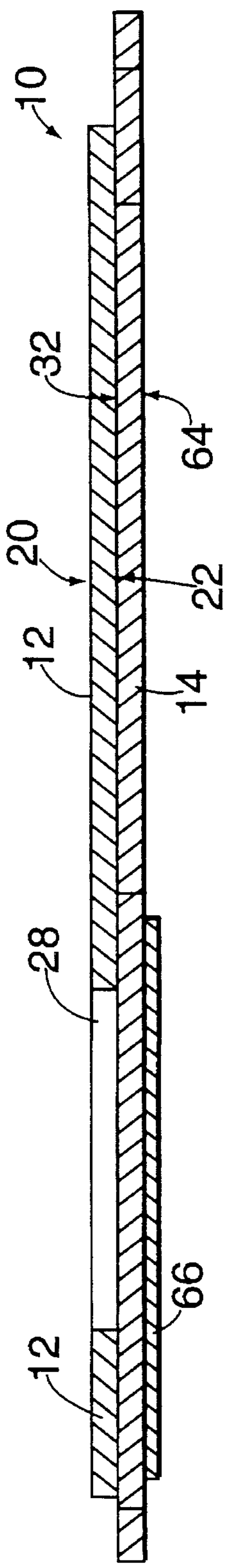
FIG. 3 is a schematic cross-section view of the shipping label taken generally along line 3—3 of FIG. 1.
Figure 2:
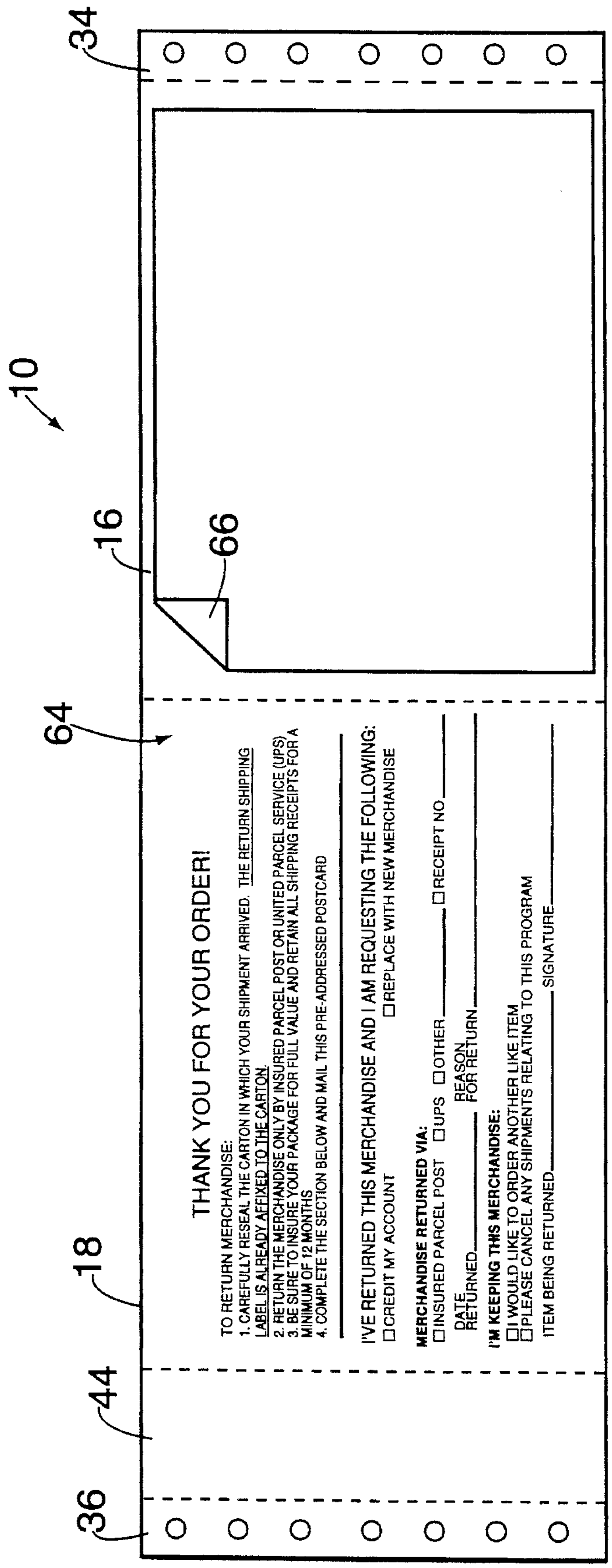
FIG. 2 is a bottom view of the shipping label.

FIGS. 1–3 are top, bottom and cross-section views, respectively, of a shipping label 10 in accordance with the present invention. The label 10 comprises an initial address label 12 releasably secured to a sheet 14 comprising a return label 16 and an advisory postcard 18.

The initial address label 12 includes a front surface 20 and a back surface 22. The front surface includes an area 24 on which the name and address of an initial recipient may be imprinted. The words "SHIP TO" or "TO" may be provided adjacent the area 24 to indicate the address therein as being the shipping destination. Other information may also be printed on the front surface of the initial label 12 like, for example, instructions for use of the label 10 as indicated at 26.

A window or cut-out portion 28 extends through a portion of the left side of the initial address label 12 to expose an area 30 on the return label 16 at which the address of the initial sender can be imprinted. The word "From" is imprinted on the initial address label 12 adjacent the window 28 to indicate the address therein as being the return address of the sender.

The back surface 22 of the initial address label 12 is coated with an adhesive material to releasably secure the initial address label 12 to the sheet 14 therebeneath.

Figure 4:
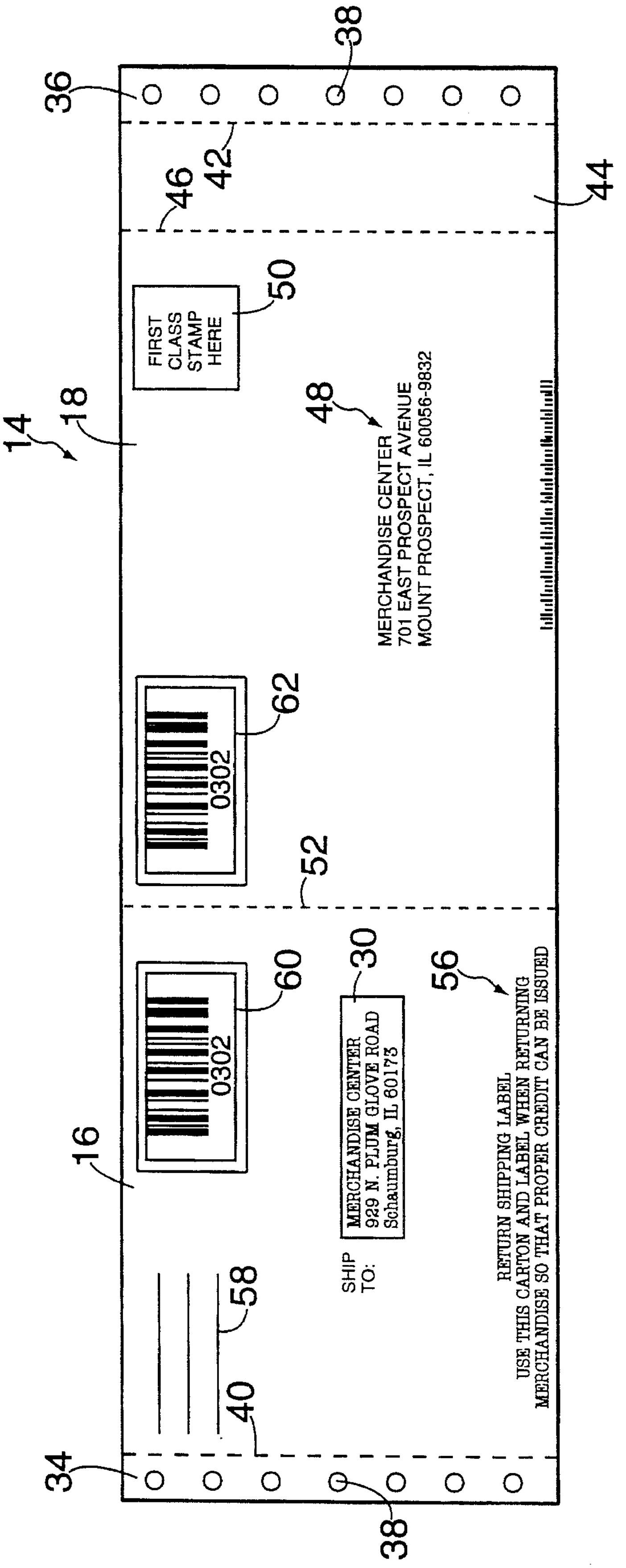
FIG. 4 is a top view of a portion of the shipping label comprising a return shipping label and an advisory postcard.

As shown in FIG. 4, the sheet 14 includes the return label 16 and the advisory postcard 18, and it preferably comprises 75 pound high-bulk postcard stock or other stock meeting postal regulations for postcards. At opposite ends of the sheet 12 are removable margins, 34, 36, which may include openings 38 therein adapted to be engaged by a printer sprocket wheel (not shown) to facilitate feeding the label 10 through a printer (not shown). The margins 34, 36 may be removed by a user along perforation lines 40, 42, respectively.

The sheet 14 also includes a longitudinal strip 44 between the advisory postcard 18 and the margin 36. The longitudinal strip 44 may be separated from the postcard along perforation line 46.

The postcard 18 includes an area 48, at which the name and address of the intended recipient of the card is pre-printed. The postcard 18 also includes an area 50, at which the sender of the card may affix a postage stamp. Although not shown, the postcard 18 may comprise a business reply mail card, in which postage has been pre-paid by the intended postcard recipient. The postcard 18 may be separated from the return label 16 along perforation line 52.

The return label 16 includes the area 30 at which the address of the original shipping location is imprinted. The area 30 is aligned with the window 28 in the initial address label 12 such that the address therein is exposed through the initial address label 12. The address on the return label 16 and that on the postcard 18 will normally be different as the postcard will usually be sent to an accounting or invoicing center of the original shipper and the return label will be usually sent with the shipping carton to the original shipping warehouse location.

Instructions for use of the return label 16 may be provided at an area 56. The return label 16 also includes an area 58 at which the sender of the return label may write-in his or her name and return address.

Bar codes 60, 62 or other optically readable marks, characters or symbols may be laser imaged on the return label 16 and on the postcard 18 to provide customer and/or order information to facilitate outgoing shipment tabulation and reconciliation of returned merchandise with customer accounts. The bar codes on the return label and the postcard will normally be the same, but may be varied as needed. As shown in FIG. 1, the bar codes 60, 62 are not covered by the initial address label 12 and are exposed in the top view of the label 10.

A substantial portion of the front surface 32 of the sheet 14 is coated with a layer of silicone or other similar material to allow the initial address label 14 with its adhesive coated back surface 22 to be peeled off without degrading the front surface 32 of the sheet 14. The postage stamp area 50 of the postcard 18 is not normally covered with the silicone material, which might make it difficult for a user to securely affix a postage stamp to the area 50. The adjacent area on the back surface 22 of the initial address label 12 corresponding to the area 50 is accordingly not coated with adhesive material. The bar code areas 60, 62, the sender return address area 58 and the shipping address area 30 are also generally not silicone-coated as these areas are not covered by the initial shipping label 12.

As shown in FIG. 2, the back surface of the postcard 18 may have printed thereon information relating to merchandise return procedures or a questionnaire requesting information from the shipment recipient.

The back surface of the return label 16 is coated with pressure-sensitive adhesive to render the return label self-adhesive. A release backing sheet 66 is provided for covering the adhesive coated back surface.

The shipping label 10 may be used, for example, by a merchandiser for shipping a carton to a customer. The merchandiser initially has available for use a plurality of labels 10 prepared by a label manufacturer. In each label, the merchandiser's invoicing or accounting address has been pre-printed in area 48 of the postcard 18. The shipping address of the merchandiser may also have been pre-printed in area 30 of the return label 16, although this address may be subsequently computer imprinted by the merchandiser.

After a customer has placed a merchandise order, the label 10 is fed through a printer and the customer's name and address are printed in area 24 of the initial label 12. Bar codes 60, 62 may, at the same time, be laser imaged on the postcard 18 and return label 16 at areas not covered by the initial label 12. The merchandiser's shipping address may also be printed in the area 30 of the return label if this address has not already been pre-printed by the label manufacturer. After removal from the printer, the margins 34, 36 at the edges of the label 10 may be torn off at perforation lines 40, 42, respectively.

The label 10 can then be affixed to the shipping carton or container (not shown). First, the release backing sheet 66 on the back surface 64 of the return label 16 is peeled off to expose the adhesive coated back surface of return label, which is then adhered to the shipping carton thereby securing the left side or return label side of the label 10 to the shipping carton. Next, the right side of the initial address label 12 extending over the longitudinal strip 44 is lifted off the strip 44. The strip 44, which is now exposed, is then separated from the postcard 18 along from perforation line 46. The right side of the label 10 is then adhered to the carton by pressing the exposed portion of the back surface 22 of the initial address label 12, which has an adhesive coating thereon, onto the shipping carton. The label 10 can thus be securely affixed to the carton at both ends of the label. The merchandiser can then provide the carton to the post office or a delivery service for shipment to the customer.

If, after receiving the carton and inspecting the merchandise therein, the customer decides to return some or all of the merchandise, he or she can use the label 10 to easily prepare the same shipping carton for delivery to the merchandiser. The customer first peels off the initial shipping label 12 from the sheet 14, thereby exposing the postcard 18 and the return label 16. The postcard is then detached from the return label along perforation line 52. The customer can fill in any information requested on the back of the postcard, stamp the postcard and mail it to the merchandiser. As previously noted, the postcard 18 is pre-addressed to the invoicing or accounting department of the merchandiser. Upon receipt of the postcard, the merchandiser can provide immediate credit to the customer's account or take some other action.

The return label 16 remains affixed to the carton and is pre-addressed at 30 with the warehouse or shipping address of the merchandiser. The customer may fill in his or her return address in the area 58 of the label. The shipping carton can then be provided to the post office or a delivery service for delivery to the merchandiser.

The postcard 18 is optional and can be omitted from the label 10. The postcard may not be necessary, especially if the merchandiser's invoicing or accounting center and its shipping warehouse are located at the same address. If the postcard is omitted, the overall size of the shipping label 10 can be reduced to facilitate use on small cartons.

If the merchandiser wants returned goods to be sent to a single return location all the time, the label 10 may be modified to eliminate the window 28 in the initial address label 12. The initial shipping address of the merchandiser can thus be pre-printed on the initial label 12 as the "From" address. The merchandise return address can be printed on the return label 16 such that it is covered by the initial label 12.

A shipping label in accordance with the present invention can thus be used by a shipper to facilitate delivery of a shipping carton to a customer, and thereafter by the customer to conveniently prepare the carton for return delivery to the shipper.

The present invention has been described in the foregoing specification with respect to specific embodiments. These embodiments serve as examples to illustrate the invention rather than to limit its scope. Modifications may be made thereto without departure from the broader teachings of the invention.

I claim:

1. A two-way shipping label for attachment to a shipping container, said shipping label being useable by a first party to facilitate delivery of the shipping container to an address of a second party, and thereafter by the second party to facilitate delivery of the shipping container to an address of the first party, the shipping label comprising:

a return label having opposite front and back surfaces, wherein said back surface is attachable to the shipping container, and said address of said first party is imprinted on said front surface;

an initial address label having opposite front and back surfaces, wherein the address of the second party may be imprinted on said front surface, said back surface being releasably secured to the front surface of said return label to partially cover the front surface of said return label with a portion of said return label being exposed such that said portion can be imaged with machine readable indicia, wherein said initial address label can be removed from said return label to expose said return label for preparing said shipping container for delivery to the address of said first party; and a pre-addressed advisory postcard comprising postcard stock adjacent and removably affixed to said return label, wherein said initial address label is releasably secured to said postcard and at least partially covers said postcard.

2. The shipping label of claim 1, wherein said initial label includes a window extending therethrough to expose said address of said first party indicated on said return label as a return address.

3. The shipping label of claim 1, wherein the postcard is pre-addressed to indicate an address different from the address of the first party.

4. The shipping label of claim 1, wherein said machine readable indicia are optically scannable.

5. The shipping label of claim 1, wherein said machine readable indicia comprise bar codes.

6. The shipping label of claim 1, further comprising removable margins including openings therein adapted to be engaged by a printer sprocket wheel.

7. The shipping label of claim 1, wherein said front surface of said return label is at least partially coated with silicone and said back surface of said initial address label is at least partially coated with an adhesive to releasably secure the initial address label to the return label.

8. The shipping label of claim 1, wherein at least a portion of the back surface of the return label is coated with a pressure-sensitive adhesive, and wherein the shipping label further comprises a release backing for covering the back surface of the return label.

9. The shipping label of claim 1, further comprising a strip adjacent and detachably secured to said return label, and wherein at least a portion of said initial label extends over and is releasably secured to at least a portion of said strip.

10. A two-way shipping label for attachment to a shipping container, said shipping label being useable by a first party to prepare the shipping container for delivery to an address of a second party, and thereafter by the second party to prepare the shipping container for delivery to an address of the first party, the shipping label comprising:

a return label having opposite front and back surfaces, wherein said back surface is attachable to the shipping container, and said address of said first party is indicated on the front surface of said return label; and an initial address label having opposite front and back surfaces, wherein the address of the second party is imprinted on said front surface, said initial address label partially covering the front surface of said return label and including a window extending therethrough for exposing a portion of the return label having the address of the first party indicated thereon, wherein said initial address label can be lifted off said return label, thereby exposing said return label to prepare said shipping container for delivery to the address of said first party, said back surface of said initial address label being releasably secured to the front surface of said return label.

11. The shipping label of claim 10, further comprising a pre-addressed advisory postcard adjacent and removably affixed to said return label and said initial address label is releasably secured to said postcard and at least partially covers said postcard.

12. The shipping label of claim 11, wherein said postcard comprises high-bulk postcard stock.

13. The shipping label of claim 11, wherein said postcard and said return label comprise high-bulk postcard stock.

14. The shipping label of claim 11, wherein said postcard and said return label each include bar codes thereon for facilitating outgoing shipment tabulation and reconciliation of returned shipments.

15. The shipping label of claim 10, further comprising removable margins including openings therein adapted to be engaged by a printer sprocket wheel.

16. The shipping label of claim 10, further comprising a silicone coating on at least a portion of the front surface of said return label and an adhesive coating on at least a portion of the back surface of the initial address label.

17. The shipping label of claim 10, wherein at least a portion of the back surface of the return label is coated with a pressure-sensitive adhesive to make the shipping label self-adhesive.

18. A method of using a two-way shipping label for preparing a shipping container for delivery from a first address to a second address and then for delivery from the second address back to the first address, said shipping label comprising a return label having opposite front and back surfaces, said front surface being pre-addressed with said first address; and an initial address label having opposite front and back surfaces, said back surface of said initial label being releasably secured to the front surface of the return label, said method comprising:

printing the second address on the front surface of the initial label, and attaching the back surface of the return label to the shipping container to prepare the container for delivery to said second address; and after receipt of said container at said second address, removing said initial address label from the return label to expose the front surface of the return label to prepare the container for delivery to said first address.

19. The method of claim 18, wherein said shipping label further comprises an advisory postcard having an address indicated thereon, said postcard being adjacent and removably affixed to said return label, and wherein said initial address label is releasably secured to said postcard and at least partially covers said postcard, and wherein said method further comprises the steps of removing said initial label from said postcard after receipt of said container at said second address and thereafter sending the postcard to the address indicated thereon.

* * * * *